Nov. 25, 1969　　　H. D. HILFIKER　　　3,480,291
SAFETY CONSTRUCTION FOR VEHICLES
Original Filed March 8, 1967　　　3 Sheets-Sheet 1
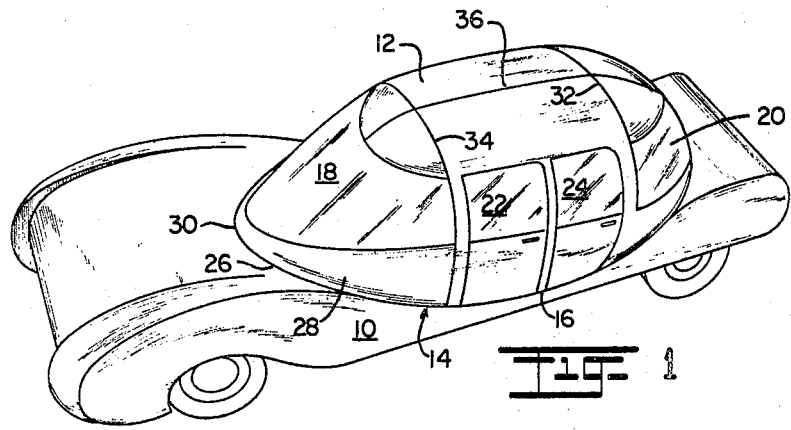
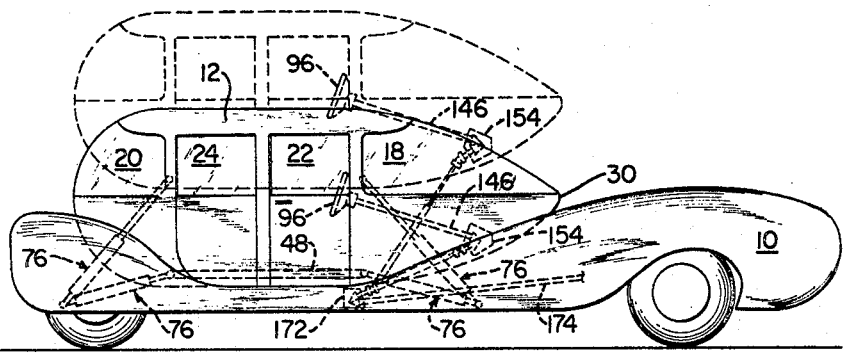
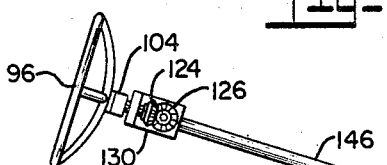
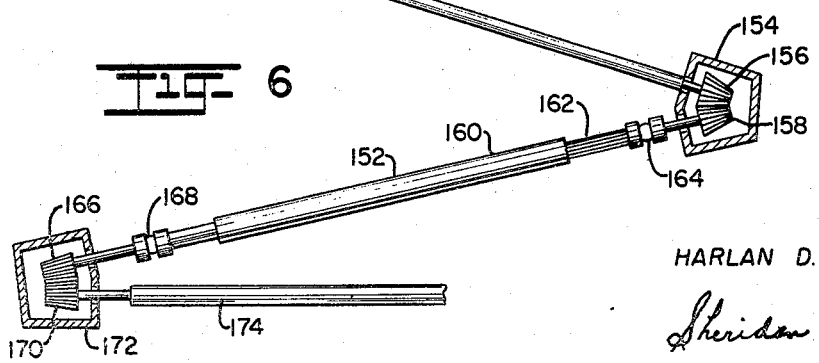
INVENTOR
HARLAN D. HILFIKER
ATTORNEYS

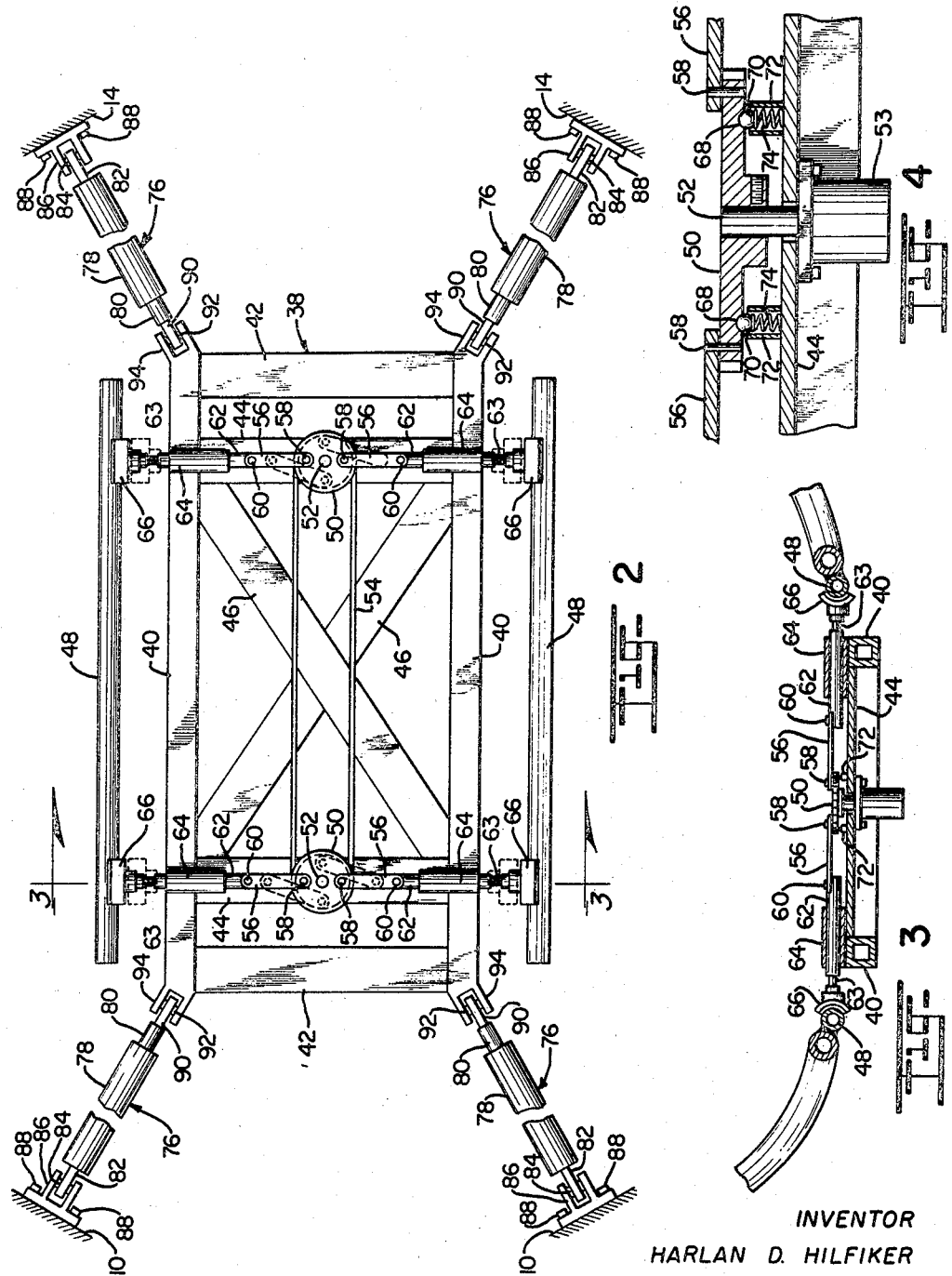

Nov. 25, 1969   H. D. HILFIKER   3,480,291
SAFETY CONSTRUCTION FOR VEHICLES
Original Filed March 8, 1967   3 Sheets-Sheet 3

INVENTOR
HARLAN D. HILFIKER

ATTORNEYS

United States Patent Office

3,480,291
Patented Nov. 25, 1969

1

3,480,291
SAFETY CONSTRUCTION FOR VEHICLES
Harlan D. Hilfiker, 12195 W. Ohio Place,
Denver, Colo. 80228
Original application Mar. 8, 1967, Ser. No. 621,694.
Divided and this application Aug. 26, 1968, Ser.
No. 772,885
Int. Cl. B62d 27/06
U.S. Cl. 280—87       4 Claims

ABSTRACT OF THE DISCLOSURE

The invention is a safety construction for automobiles in which the body is detachably mounted to the chassis, the body resting on a cradle-shaped upper surface of the chassis so that upon a high speed impact of the vehicle with another object the body separates completely from the forward end of the chassis traveling in an upward direction to gradually decelerate the body and passengers. The forward end of the body is of bullet-shaped design to provide deflection of the body from its line of travel if another object is contacted by the curving surfaces of the bullet-shaped forward end, thus preventing instantaneous deceleration to zero as occurs in head-on collisions. The vehicle may be operated with the body at different elevations and is provided with a safety oriented collapsible steering mechanism.

---

This is a division of application Ser. No. 621,694, filed on Mar. 8, 1967.

This invention relates to a safety construction for vehicles of the type wherein the body is releasably secured to the chassis to permit its release therefrom upon impact of the chassis with another object with sufficient force.

The national concern over the rising fatalities caused by automobile accidents is well known. This concern has resulted in the incorporation of many safety features in the modern automobile. These safety features include safety belts, padded dashboards, padded sun visors, and others within the passenger compartment. While these safety features are somewhat effective in preventing serious accidents from low speed impacts, they are almost totally ineffective to prevent fatalities in high speed impacts of an automobile with other objects, such as another automobile. This is because the construction of the modern automobile does not provide for the gradual deceleration of the passengers upon high speed impact, the passengers being instantaneously decelerated to zero upon impact as they are hurled against another object.

Accordingly, it is the principal object of this invention to provide a safety construction for vehicles which insures safe and gradual deceleration of the vehicle passengers upon high speed impact or collision.

It is another object of this invention to provide a safety construction for automobiles in which a detachable body is so constructed that maximum protection is provided against instantaneous deceleration to zero upon contact with an object.

It is another object of this invention to provide a safety construction adaptable for use in various types of vehicles, including vehicles traveling on land or water, and in the air.

It is another object of this invention to provide a safety construction for vehicles in which the body is detachable from the chassis and in which the body can be elevated with respect to the chassis to permit travel of the vehicle with the body at different elevations.

It is a further object of this invention to provide a safety construction for automobiles having an attractive exterior appearance and minimum weight advantages.

2

It is a further object of this invention to provide a safety steering construction of the collapsible type which is adaptable for use in all types of vehicles.

The above and other objects are accomplished by a passenger body with a substantially bullet-shaped forward end detachably mounted on the cradle-shaped upper construction of the chassis which gives the body an upward direction of travel as it separates from the chassis, the body being mounted on the chassis by a construction which permits its elevation with respect to the chassis to provide for maintenance activities and travel of the vehicle with the body in an elevated position, the body having tracks on its underside attached to the chassis by means which permit relative movement between the body and the chassis only upon impact of the chassis with another object with a predetermined force, and the entire steering construction for the vehicle being collapsible into a well in the padded nose section upon high high speed impacts.

The invention will now be explained in detail with reference to the accompanying drawings, in which, FIGURE 1 is a perspective view showing the exterior of an automobile modified with the safety construction of the invention;

FIGURE 2 is a top plan view of the chassis support structure for the body showing the manner of attachment of the tracks of the body to it and the means by which the body is elevated to various positions;

FIGURE 3 is a partial cross-sectional view taken on the line 3—3 of FIG. 2;

FIGURE 4 is a fragmentary section of the central portion of FIG. 3 in enlarged detail;

FIGURE 5 is a side elevational view of an automobile incorporating the safety construction of the invention and showing in dotted lines the body in an elevated position;

FIGURE 6 is a side elevational view of a sector of the steering mechanism looking toward the left side of the vehicle;

Figure 7:
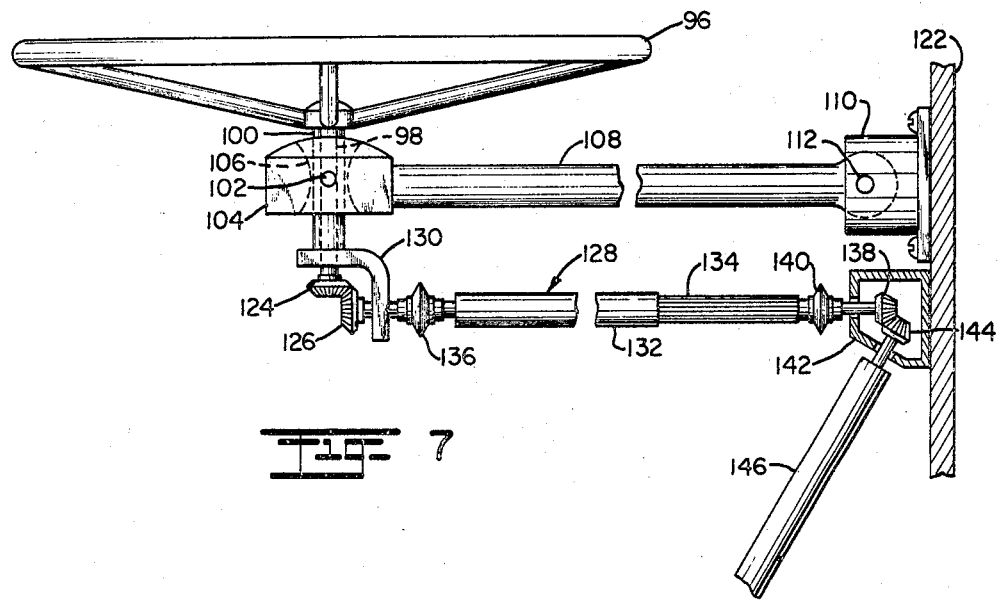
FIGURE 7 is a side elevational view of another sector of the steering assembly looking from the front of the vehicle in the direction of the steering wheel.

The invention will be described, in accordance with the drawings, in its application in an automobile; however, it is not limited to this application as it can be used on aircraft, boats, and other type vehicles.

Broadly, the illustrated embodiment of the invention comprises an automobile chassis 10 having releasably mounted thereon a body 12, including a passenger compartment, detachably secured to the chassis by tracks mounted on the chassis as shown in FIG. 2. As will be seen, the forward end of the body is pointed and of substantially bullet-shaped configuration. The frontal section is so designed that all surfaces extend rearwardly from a foremost point in a substantially arcuate path. When a high speed collision occurs, such as a collision with the front end of an oncoming automobile, the body 12 releases from its fixed position on the chassis to continue the direction of travel of the vehicle prior to impact while the velocity of the chassis is instantaneously reduced to zero. The body 12, due to the energy absorbing slide track mechanism and upward curving of the cradle-shaped area on which it is mounted on the chassis, will travel in an upward direction and its velocity and that of the passengers it is carrying will be gradually reduced before it strikes the ground. This results in far less likelihood of fatalities than in the case of impact of two conventional automobiles in which the bodies of both, and consequently the passengers, are instantaneously decelerated to zero by impact. If the respective bodies of the colliding chassis contact each other, they will be deflected in opposite directions due to the pointed configuration of their forward ends. Likewise, if the chassis strikes a tree, post or other object other than a wall or sheer embankment, the body portion 12 will be similarly deflected around the object so that it will continue to travel until its forward velocity reaches approximately zero or is substantially reduced before it contacts the ground and skids to a stop.

The safety construction of the invention will now be described in greater detail. As seen in FIG. 1, the automobile modified by the safety construction includes the chassis 10 having a front end comprised of hood, motor etc., and the rear end including the conventional side and top panels etc. The trunk is located just behind the engine compartment in the running gear chassis where it serves as an impact cushion. The conformation of the top of the chassis between its ends is in the form of a cradle or saddle represented generally by the numeral 14. This construction provides for an upwardly sloping surface at the front of the cradle area. The body 12, including the passenger compartment, is detachably mounted in the cradle 14 and the configuration of its bottom side conforms generally to that of the configuration of the cradle.

The construction of body 12 is arcuate in cross section both in the horizontal and in the vertical plane. It is provided with shatterproof arcuate-shaped windshield 18 and arcuate-shaped rear window 20. The illustrated modification is a two-seated construction with doors 22 and 24; however, the construction is not limited to any number of seats. It can be made interchangeable to permit use on different sized chassis. At the front end of the body, the arcuate-shaped bottom 26, arcuate-shaped sides 28 and arcuate windshield 18 meet at point 30 to provide a front end of substantially bullet-shaped configuration. The framework of the body 12 is preferably of hollow tube construction with front and rear transverse roll bars located beneath lines 32 and 34 and longitudinal bar located under line 36. The roll bars as well as all other structural elements of the body are preferably of tubular construction in the interest of maximum strength per unit weight. The outward appearance of the assembly of chassis and body simulates that of a conventional automobile.

Reference will now be made to FIGS. 2, 3 and 4 in describing the manner of attachment of the body to the chassis. The upper support structure 38 of the chassis 10, secured thereto by bolts or other conventional means, comprises longitudinal struts 40, horizontal struts 42 and 44 and diagonal struts 46. The body 12 is provided with tubular slide tracks 48 mounted on each side thereof. The tracks 48 are connected to the support structure 38 by releasable connecting means. Since the releasable connecting means is identical for all brake shoes, it will be described for only one of them. A sprocket wheel 50 having gear teeth on its outer periphery is mounted in a horizontal plane centrally of each cross strut 44 by means of rotatable main shaft 52. The sprocket wheels 50 are connected by a drive chain 54 so that they are driven simultaneously. An actuating link 56 is hingedly mounted at one end through hinge pin 58 to sprocket wheel 50 near its periphery and at its other end by means of hinge pin 60 to actuating shaft or push-pull rod 62. Actuating shaft 62 reciprocates in guide cylinder 64 mounted on longitudinal strut 40 and is fixedly attached to slide friction brake shoe 66 by suitable means. An adjustment screw 63 with threads on each end is threadably attached in the hollow end of shaft 62 and the hollow stub shaft of shoe 66 and serves as a means for adjusting the length of shaft 62. Slide tracks 48 are shown as being of circular construction but they may be of solid construction and may be of rectangular or other configuration. Slide friction brake shoes 66 are of semi-circular construction to conform with the configuration of slide tracks 48. It will be seen from the above described construction that when sprockets 50 are rotated in the direction indicated by the arrows, the brake shoes will be thrust outwardly to grip the tracks 48 and they will be released by rotation of the sprockets in the opposite direction.

Ball detent release mechanism for insuring that the releasable clamping means will lock and not release through vibration is shown in FIGS. 3 and 4. Sprocket wheels 50 are provided on their lower surface with one or more detents or sockets 68 in which locking balls 70 are seated. The locking balls are conventionally mounted by means of tubular shafts 72 welded to cross struts 44. The locking ball 70 is outwardly biased by means of spring 74.

It is important that mechanism be provided for insuring that the body 12 is not released for relative movement with the frame 38 until a predetermined forward force is exerted by impact on the chassis 10 with another object. Such mechanism is provided by incorporating in the shafts 62 a conventional turn screw adjustment structure 63, previously described, which is operative to lengthen or shorten shaft 62 to correspondingly increase or decrease pressure of brake shoes 66 on rails 48.

The releasable clamping means for releasably securing the body 12 to the support structure 38 just described is illustrative only of various means which may be used to accomplish the same function. Also, the ball and detent mechanism for preventing vibration is illustrative only of one means for accomplishing this objective, as other means can be used. Further, the slide friction tracks need not necessarily be mounted on the body as they could be mounted on the chassis, and various other equivalent means for providing a sliding contact between the body and the chassis may be used. The friction brake tracks may be inset into the bottom of the passenger unit or they may be on the outside thereof. The mechanism is so constructed that the body 12 rides well above support structure 38 with sufficient clearance to permit passage thereover after it is released from the support structure. The sprockets 50 are actuated by electric motor 53, connected to one of shafts 52, and it may be a modified conventional automobile starter motor. The sprockets may be actuated hydraulically, pneumatically or otherwise.

The releasable clamping means for the brake shoes may be provided with manual release which can be operated from the passenger compartment. This would be used during maintenance procedures or when non-impact hazards occur, such as, the body going over a cliff or into a body of water. Roll responsive actuating mechanism for the brake shoe release mechanism is provided for actuating the brake release mechanism to accommodate side collisons or roll-overs. Another actuating switch, not shown, for the release mechanism is mounted on the main chassis to be operative automatically energized only when the chassis is completely immersed in water. In addition, the energy absorbing friction brake system is so designed that the force incurred during roll-over or side collisions will shear the brake actuator shafts 62, therefore, separating the passenger unit. This is a safety provision in the event the roll responsive actuating mechanism does not operate properly.

The operation of the releasable clamping mechanism for releasably attaching the body 12 to the support structure 38 will now be described. In the event of a high speed collision of the chassis with another object to provide a forward force on the body 12 sufficient to override the pressure between the brake shoes and slide tracks, the body will be released from the chassis and propelled forwardly along the cradle 14 and the upwardly inclined forward surface thereof. As it travels along this path, the energy absorbing friction brake slide track assembly will provide gradual deceleration of the passenger cab and the passengers. The tension between the brake shoes 66 and the slide track rails 48 is preferably adjusted so that the mechanism will not allow forward motion unless a relative forward force on the body equal to that produced by a head-on collision of automobiles traveling approximately 10 m.p.h. or more is encountered. The mechanism is also preferably designed so that the body will be decelerated to the point where it will not reach the end of the tracks and separate unless impacts are encountered creating the force of an automobile hitting a wall at a speed of forty miles and more. Upon impact creating a force greater than this, for example, the body will be projected forwardly and upwardly from the chassis. The upward travel of the body places the inertial force of the passengers upon their seats and the contour of the forward end of the body will permit it to skim over or around any object with which it collides, so that the airborne passenger unit will be rapidly decelerated by the energy absorbing airdrag on the lightweight structure before the body strikes the ground. The result is that direct head-on collisions are avoided and the chances for the occurrence of fatalities occasioned by head-on collisions at high speeds are greatly reduced. Preferably, the front and rear brake shoes are spaced apart a distance which provides for a four to five foot travel of the tracks and body over them before the tracks are completely disengaged from the brake shoes.

The body 12 may be provided with suitably located rocket motors to prolong its travel or control its trajectory, and with drag parachutes or other means for decreasing its deceleration at a safe rate.

The body is constructed of lightweight material to provide buoyancy to permit its floating on water in case it is projected onto water from either an automobile or aircraft. Its buoyancy is increased by filling hollow spaces in the nose section, spaces under the seats, behind the rear seat etc., with low specific gravity material, such as, foamed plastics. As stated above, mechanism for automatically releasing the body from the chassis upon complete submersion of the body can be provided by conventional means. In case of a side impact of sufficient force to endanger the lives of the passengers, the actuating shafts 62 will automatically be sheared to permit release of the passenger capsule. In case the vehicle rolls over sideways before the capsule releases, the roll sensitive actuating mechanism will actuate the motor for the brake release mechanism to permit the body to separate from the chassis and continue rolling separately until it has decelerated.

Driver controls in the passenger unit are operated precisely as they are in the conventional automobile. Electrical quick-release or disconnect plug connectors and hydraulic brake line quick-disconnects can be located at the base of the passenger unit on the friction brake slide assembly. Steering is operated hydraulically or mechanically by conventional worm gear type steering by using a series of universal joints and angular transfer boxes. If mechanical steering is employed, telescoping splined connecting shafts can be used to permit separation of the body from the chassis. Hydraulic and electrical systems for driver control of steering, shift lever, brakes, etc. may be provided with appropriately located suitable mechanism connected to the control elements in the passenger compartment by flexible hoses or means which allow relative movement between the passenger cab and the chassis without loss of control of the functions in the event the capsule is not completely separated from the chassis. The hoses, wiring and other connections are provided with standard quick-disconnect coupling devices which separate if the body separates completely from the chassis.

The semi-pointed or cone-shaped windshield of the passenger unit prevents a full contact blow to passengers when thrown forward. They would merely slide down the contour onto a Styrofoam cushioning which would fill the bottom portion of the nose section. The Styrofoam nose section is covered with decorative leatherette which eliminates the metal dashboard. The instrument panel is preferably recessed about a foot into the Styrofoam nose section. The steering wheel will be located centrally of the recessed instrument panel. The special safety steering design, to be described later, will permit the steering wheel to retract into the recessed instrument panel upon collision impact of sufficient force from the driver (approximately 60 to 80 pounds). This feature is also convenient for passenger admission and exiting.

Reference is now made to FIGS. 2 and 5 for a detailed description of the mechanism for elevating the body 12 so that the vehicle travels with the body in an elevated position. Lowering and raising of the body is accomplished by the means of four hydraulically actuated jacks 76 located at each corner of the support structure 38. As the four jacks are identical only one will be described. Each of the hydraulic jacks is comprised of a cylinder 78 and a hydraulically operated piston 80. The cylinder 78 is anchored at one end by means of connecting rod 82 rotatably connected to trunnion shaft 84 mounted in trunnion bracket 86 which is in turn anchored by bolts 88 or other suitable means to chassis 10. The other end of the jack 76 is connected to support structure 38 by means of connecting rod 90 which is connected to piston 80 at one end and rotatably connected at the other end to trunnion shaft 92 which is anchored in trunnion bracket 94 constructed integrally with strut 40 of the support structure 38. It is to be noted that each of the trunnion brackets 94 is constructed to extend from the corners of the support structure 38 at an angle. The jacks 76 can be operated hydraulically, pneumatically or by other suitable means. They are actuated by a control in the driver's compartment and associated hydraulic lines, pumps etc. of conventional construction.

Referring to FIG. 5, wherein the passenger cab is shown in its elevated position in dotted lines, it will be seen that upon actuation of the jacks 76, the pistons 80 are expanded to lift the cab into the elevated position where it is locked by hydraulic pressure or other suitable means while the vehicle is in operation.

The elevation mechanism for permitting operation of the vehicle with the cab in elevated position would have utility upon the adoption of a nationwide safety rule requiring automobiles going in one direction to elevate the passenger units and automobiles going in the opposite direction to keep them lowered or at a different elevation. The height differential would allow greater glancing capability in case of collisions of meeting vehicles.

Figure 8:
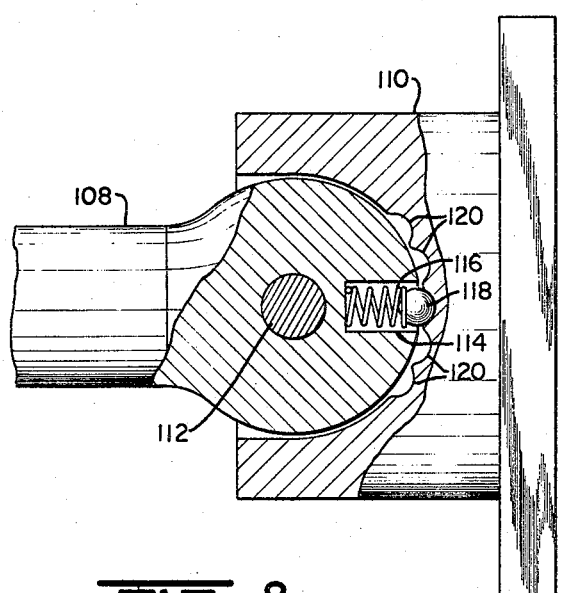
FIGURE 8 is a partial vertical section taken of the connection between the mounting post for the steering wheel and its mounting bracket attached to the side of the vehicle.

Reference will now be made to FIGS. 6–8 for a detailed description of the safety steering mechanism of the invention. This feature of the invention is necessarily described in connection with an automobile having the deachable passenger body feature; however, it is not limited in application to this specific type of vehicle as it can be used on any type vehicle, and particularly, any type automobile.

As shown in FIG. 7, a conventional type steering wheel 96 is mounted on short steering shaft 98 which is rotatably enclosed in shaft housing 100. The steering housing 100 is rotatably secured to hinge pins 102 which are transversely mounted in circular trunnion 104. The centrally located trunnion channel 106 in which steering shaft 98 is mounted by means of housing 100 and hinge pins 102 are flared outwardly at either end as shown to permit rotation of steering shaft 98 about hinge pins 102. This structure insures that the steering element will maintain its orientation with respect to the driver as the steering mechanism moves forward and backward.

Main support shaft 108 is secured to trunnion 104 at one end and at the other end to mounting bracket 110 by hinge pin 112 about which the main shaft rotates.

As shown in FIG. 8, the main shaft 108 may be positioned in various orientations by a locking detent mechanism consisting of spring channel 114, spring 116 which outwardly biases a locking ball 118 into any one of detents 120. As shown, in FIG. 8 the main shaft 108 is locked in a substantially horizontal orientation parallel to the front dashboard, mounting bracket 110 being secured to the side 122 of the vehicle. The locking mechanism is adjusted to prevent forward movement of the main shaft 108 toward the dashboard upon a force of less than 60–80 pounds being applied to the steering wheel in the direction of the dashboard.

Mechanical connection between steering shaft 98 and the terminal forward steering assembly of conventional construction is effected by means of a series of universal joints, gear boxes and spline shafts. Gear 124 attached to the forward end of the steering shaft 98 is enmeshed with gear 126 attached to the one end of shaft 128. The gears 124 and 126 are supported in meshed arrangement by means of angled support element 130.

Splined shaft 128 comprised of cylinder 132 and shaft 134 mounted therein in telescoping arrangement is connected at one end to gear 138 through a flexible connection 140. The flexible connections 136 and 140 may be universal joints, or other type joints permitting full freedom of movement.

Gear 138 in angled gear box 142 is connected to angled gear 144 which is in turn connected to diagonal shaft 146. Shaft 146 is connected to telescoping shaft 152 (FIG. 6) through angle gear box 154, angle gears 156 and 158. Telescopic shaft 152 comprised of cylinder 160 and telescoping piston 162 is connected to gear 158 through universal joint 164 and at the other end to angle gear 166 through universal joint 168. Angled gear 166 is meshed with angle gear 170, both of which are mounted in angle gear box 172. Angle gear box 172 is connected to shaft 174 which connects at its forward end to conventional terminal steering gear mechanism. The mechanical connection between steering shaft 98 and the terminal forward steering mechanism is not restricted to the mechanism described, as other suitable connecting mechanism may be used. The important feature of the steering mechanism is the manner in which the steering wheel is mounted by horizontally oriented hinged support shaft 108 to permit its movement forward upon sufficient forward force being applied to its to collapse in a well in the dashboard such as that described for the detachable body 12 upon a high speed collision causing the driver to be thrown forward with a force in excess of 80 pounds. The ball detent locking mechanism is adjusted so that the steering wheel will not be moved forwardly during a low speed impact. It can be seen that the described construction eliminates the conventional vertical shaft upon which the driver is often impaled in a high speed collision. The described safety steering device is simple in construction and can be readily attached in operating condition to conventional automobiles. The telescoping splined connecting shafts permit detachment of the body from the chassis as the shafts detach readily from their cylinders.

Numerous advantages stem from the automotive safety construction described above. The construction eliminates the ever present possibility in conventional automobiles of the engine tearing loose from its mount and entering into the passenger area by breaking through the firewall. The possibility of fatal carbon monoxide poisoning and the danger of fire are substantially eliminated by the described body and chassis separation concept. The configuration of the body provides rapid deceleration after the body leaves the chassis and the pointed front configuration of the capsule provides for deflection of the capsule around or over objects with which it comes in contact, this being a principal safety feature. A further safety feature is provided by the structure permitting elevation of the capsule and travel of the vehicle with the capsule in elevated position. In addition to the above safety factors, the collapsible steering wheel adds an additional safety factor whether used with the detachable passenger cab or in conventional automobiles, in that it eliminates any rigid shafts or surfaces of steering elements which might injure passengers being hurled forwardly in a high speed impact.

It is to be understood that this invention is not limited to the exact embodiments of the methods and apparatuses shown and described, which are merely by way of illustration and not limitation, as various other equivalent forms and modifications will be apparent to those skilled in the art.

What is claimed is:

1. Safety steering means for a vehicle comprising: a steering shaft; a steering element mounted on one end of said steering shaft; a substantially horizontal support shaft having one end hingedly mounted on one side of said vehicle, said steering shaft being operatively mounted at the other end of said support shaft for pivoting around an axis substantially perpendicular to the longitudinal axis of said support shaft; and drive means connecting the other end of said steering shaft and the front wheels of said vehicle.

2. The steering means of claim 1 including a vertical channel having outwardly flared exits in said other end of the support shaft and said steering shaft being supported in said channel for pivoting about an axis substantially perpendicular to the longitudinal axis of said support shaft.

3. The steering means of claim 1 including means for locking said support shaft at various substantially horizontal orientations to prevent movement of said support shaft until a predetermined pressure is applied to said steering element.

4. Safety steering means for a vehicle comprising: a steering shaft; a steering element mounted on one end of said steering shaft; a movable support shaft hingedly mounted at one end on said vehicle, said steering shaft being operatively mounted by its other end to the other end of said support shaft for pivoting around an axis substantially perpendicular to the longitudinal axis of said support shaft and drive means connecting said other end of said steering shaft and the front wheels of said vehicle; said steering shaft and said support shaft being mounted to position said steering element forward of the driver's seat with no shaft or other obstruction between the steering element and the dashboard; whereby when sufficient momentum is imparted to the driver of said vehicle to propel him forwardly and collapse said steering means he will not be impaled on supporting shafts for said steering element.

References Cited

UNITED STATES PATENTS

| 851,680 | 4/1907 | Love | 74—493 |
|---|---|---|---|
| 3,216,521 | 11/1965 | Ulrich | 74—493 X |
| 3,362,247 | 1/1968 | Watts | 74—493 |

MILTON KAUFMAN, Primary Examiner

U.S. Cl. X.R.

74—492; 180—82